3,014,939
HALOGENATED METAL CHELATES

Rudolph W. Kluiber, Bernardsville, N.J., assignor to Union Carbide Corporation, a corporation of New York
No Drawing. Filed July 1, 1960, Ser. No. 40,196
7 Claims. (Cl. 260—429)

The present invention relates in general to halogenated metal chelates and more particularly it relates to a process for preparing the halogen-containing analogues of metal chelates of β-dicarbonyl compounds.

Metal chelate compounds of the type having at least one six-membered conjugated β-dicarbonyl chelating ring, one of the carbon atoms of at least one of the said rings being bonded to two adjacent ring carbon atoms and to a hydrogen atom, are well known in the art. A few of the halogenated analogues of these chelate compounds are also known in which the aforesaid hydrogen atom is replaced by a halogen atom.

Heretofore no general method has been discovered for forming the halogenated analogues of all of the metal chelates of the general class described above. For instance, it has been proposed to prepare halogenated copper chelate compounds by the method of interacting a copper salt with a halogenated ligand according to the equation

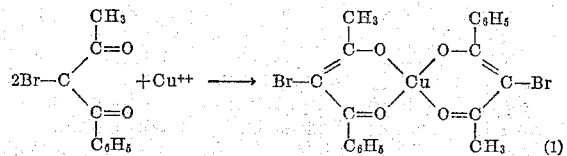

The corresponding chromium compounds can be prepared by the prior known method of direct bromination of the chromium chelate, as for example chromium acetylacetonate, represented by the equation

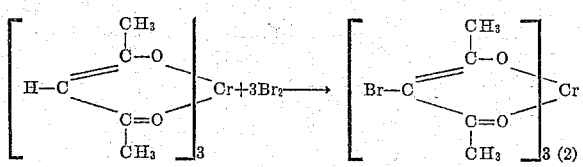

These methods are not general, however. The halogenated chromium compounds of Eq. 2 cannot be prepared by the method of Eq. 1, and vice versa.

The halogenated analogues are quite desirable since, as a rule, they can be utilized in all applications suitable for the nonhalogenated precursors, and in addition are substantially more efficacious in achieving the desired result, whatever the application.

It is therefore the general object of this invention to provide a process for preparing the halogenated analogues of metal β-dicarbonyl chelate compounds which is applicable generally, i.e., to all members of the generic group.

This and other objects which will be obvious from the specification are accomplished in accordance with the process of the present invention which comprises reacting in a substantially inert liquid organic medium, an organic halogenating agent containing a halogen having an atomic weight greater than 20 directly attached to a nonbasic nitrogen atom, with a chelate compound of a polyvalent metal having at least one six-membered conjugated β-dicarbonyl chelate ring, one of the carbon atoms of at least one of said chelate rings being chemically bonded to two adjacent ring carbon atoms and to a hydrogen atom, said hydrogen-carbon bond being the sole reactive point of said metal chelate with respect to the halogenating agent.

In terms of a chemical equation the process of the present invention is exemplified below wherein a specific β-dicarbonyl chelate compound and a specific halogenating agent are used as merely representative of the general class of each reactant which can be employed:

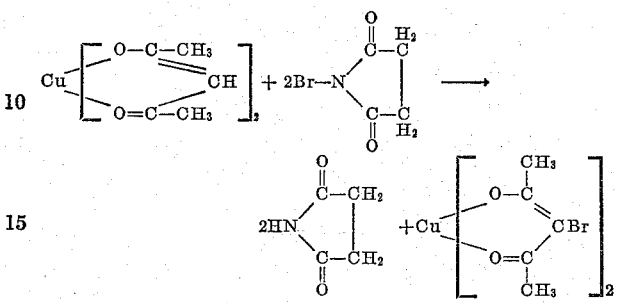

The polyvalent metal ions which have heretofore been found to enter into complex chelate formation with β-dicarbonyls include the metals classified into groups I–B, II–A, II–B, III–A, III–B, IV–A, IV–B, V–A, VI–A, VII–A, and VIII of the Mendeleeff Periodic Arrangement of the Elements (a copy of which appears at pages 310–311 in the Handbook of Chemistry and Physics, 13th ed. (1947), Chemical Rubber Publishing Company, Cleveland, Ohio). The suitable class of metals is generic in scope and includes all of the polyvalent elements which are true metals. Thus, even though boron, silicon, arsenic, and tellurium are classified in groups III–B, V–B and VI–B these elements are not generally considered to be metals and, along with the obvious nonmetals such as carbon, nitrogen, sulfur and the like, are not within the scope of the present invention.

Because of such favorable electron acceptor factors as small cation size, comparatively large nuclear or ionic charges, and appropriate electron arrangements, the transition heavy metals scandium, titanium, vanadium, chromium, manganese, iron, cobalt, and nickel, i.e., those having an atomic number of from 21 to 28 inclusive, form particularly stable β-dicarbonyl chelate compounds and are preferred. Also quite stable are the β-dicarbonyl chelates of zinc, copper, aluminum, beryllium, and gallium, and are therefore also preferred metals in the chelate compounds of the present invention.

Typical of the metals suitable but not preferred for reasons of cost and availability are yttrium, zirconium, niobium (columbium), molybdenum, rubidium, rhenium, palladium, hafnium, tantalum, tungsten, rhodium, osmium, indium and platinum.

The aforesaid general class of metal chelate compounds is well known in the art. Although certain sub-generic groups are conveniently employed in the description of the present invention, these groups represent subdivisions based on structure rather than on chemical properties. One such convenient subdivision encompasses those chelates in which the entire valence exhibited by the polyvalent metal ion is utilized in chelate ring formation. Another such subdivision encompasses those chelates in which less than the entire valence of the metal ion is satisfied by chelate rings.

Chelates in which the valence of the metal ion is utilized entirely in chelate ring formation are those which correspond to the general formula

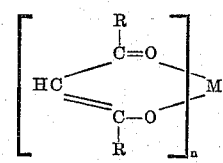

in which n has a value equal to the valence of the metal ion M. This subgeneric group includes for example

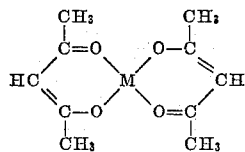

wherein M is either Cu$^{++}$, Ni$^{++}$, Be$^{++}$, or Ga$^{++}$ and

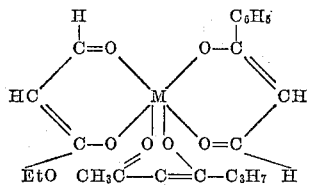

wherein M is either Al$^{+++}$, Fe$^{+++}$, Cr$^{+++}$, Ga$^{+++}$ or In$^{+++}$.

Typical of the metal chelates suitably employed which have less than the entire valence of the metal ion satisfied by chelate rings, i.e., those corresponding to the general formula

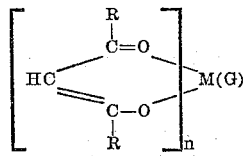

wherein G represents a group or groups other than chelate rings which satisfy the valence of the metal ion M, are the chelates formed from thallium or gold dialkyls, and having the structure

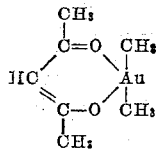

or

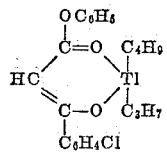

Since G represents any group or groups which satisfy the valence of M not utilized in chelate formation, it is not intended that G represent only hydrocarbon radicals or even organic radicals. For instance the oxy cations such as the vanadyl ion (V=O)$^{++}$, the uranyl ion UO$_2$$^{++}$ and the titanyl ion TiO$^{++}$ form quite stable complexes of the type

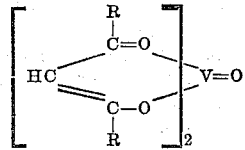

Chelates suitably employed in which other groups are represented by G are typified by

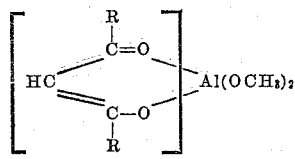

and

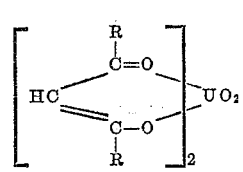

Preferably G represents oxygen, alkoxy, alkyl, aryl or halogen groups, especially oxygen and lower alkyl groups containing not more than 10 carbon atoms.

The organic radicals represented by R in any of the above general formulae are limited only to those substantially unreactive toward the halogenating agent. Thus, R at each occurrence can be alkyl such as methyl, ethyl, isobutyl, n-decyl, etc.; aryl such as phenyl and naphthyl; aralkyl such as benzyl, phenylethyl, naphthylmethyl, phenylpropyl; alkaryl such as p-ethylphenyl, m-isoamylphenyl, α-methylnaphthyl; alicyclic such as cyclopentyl, cyclohexyl; ethylenically unsaturated hydrocarbon such as propenyl, pentenyl; the halogen substituted derivatives and the oxygenated derivatives of the aforesaid hydrocarbons such as methoxymethyl, phenoxyethyl, methoxy, pentoxy, phenoxy, ethyl carboxyl, phenyl carboxy, p-ethyl phenoxy, p-chlorophenyl, p-chloromethyl phenyl, p-bromophenoxy, m-fluoromethylphenoxy, iodomethyl; and hydrogen. Amido groups such as methamido, phenylamido, cyclohexylamido, chloromethyl amido, and the like are considered to be too reactive for the purposes of this invention and are not included.

Because of the stability and ready availability of the chelate compounds in which R is either hydrogen, lower n-alkyl (up to about 10 carbon atoms), branched chain alkyls containing not more than 5 carbon atoms, or phenyl, these R groups are among the most advantageously employed members. Based solely on chemical properties, the preferred chelate compounds are those which normally have in their infra-red spectra two absorptions in the 6.25–6.75 micron region corresponding to the stretching frequencies of the >C=O and >C=C< respectively.

The halogenating agent or compound can be any compound containing a halogen atom directly attached to a nonbasic nitrogen atom, i.e., those N-halogen compounds which do not form quaternary salts with dilute (i.e. ~0.1 N) aqueous, strong mineral acids such as hydrochloric, nitric, or sulfuric acid. Preferably the halogenating agents are organic N-haloamides, including the sulfonamides, and imides, with N-halosuccinimide being particularly preferred.

The halogen of the halogenating agent preferably has an atomic weight greater than 20, i.e., is either chlorine, bromine, or iodine.

By the term "organic imide" is meant a compound derived from an acid anhydride in which one of the oxygen atoms is replaced by NH, which oxygen is in all instances the oxygen bonded to each of two carbonyl carbon atoms, as for instance

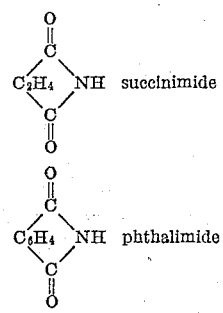

By the term "amide" is meant an organic compound containing the monovalent

or —SO$_2$NH$_2$ radical which is derived, either in theory or in fact, from carboxylic acids or sulfonic acid by replacement of the —OH group by an —NH$_2$ group as

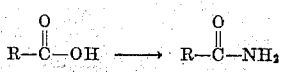

or R—SO$_2$OH→R—SO$_2$NH$_2$. The term "amide" as used herein does not include the ammonobases such as NaNH$_2$ or Zn(NH$_2$)$_2$, sometimes termed sodamide and zincamide respectively.

Specifically illustrative of the halogenating agents of the present invention, but in no way limitative thereof are N-chloroacetamide; N-iodoacetamide; N-bromoacetamide; N-chlorobenzamide; N-chlorooxamide; N-bromochloroxamide; N-chloro-p-tulene-sulfonamide (chloroamine T); N-chloro-o-toluenesulfonamide; N-bromosuccinimide; N-chlorosuccinimide; N-chlorophthalimide; N-bromophthalimide; N-iodoglutarimide; and N-bromoglutarimide.

The inert liquid organic solvent media in which the metal chelate is contacted is not a critical material. Any of the well known commercially available organic solvents such as chloroform, carbon tetrachloride, benzene, toluene, chlorobenzene, the aliphatic hydrocarbons such as heptane and hexane, the cycloaliphatics such as cyclohexane, and the more polar solvents such as dimethyl formamide, dioxane, and ethyl acetate, have all been found to be entirely suitable. By the term "inert" in describing the solvent media is meant only that the solvent does not chemically react with either the metal chelate or with the halogenating agent in such a way as to impair the fundamental halogenation reaction of the present invention. For example, the tris-(3-bromo-2,4-pentanedionates) of aluminum III, chromium III and cobalt III form chloroform adducts which are presumed to be clathrates and which can be readily desolvated by heating in vacuum to obtain the halogenated chelate free of chloroform.

The relative proportions of metal chelate to halogenating agent are not at all critical. A ratio of about one equivalent of halogen for each chelate ring has been found to be most advantageously employed, however, since lower amounts of the halogenating agent lead to incomplete halogenation, and large excess amounts of the halogenation agent result in waste. Also, particularly at high temperatures, a large excess of the halogenating agent tends to result in by-products and some cleavage of the chelate ring. Ring cleavage is destructive of the chelate compound as such and therefore is not considered to be a normal reaction of the halogenating compound with an active point on the chelate ring within the terms of reference of the present invention. Under conditions wherein the halogenated chelate is continuously removed from the reaction zone, a ratio of halogenating agent to metal chelate of 10 equivalents to 1 has been found to be quite operative, preferably from about 1.0 to about 7.5 equivalents of halogenating agent per equivalent of metal chelate compound.

The temperature range found to be most efficacious for accomplishing the present process is from about 0° C. to about 80° C., and is the preferred range, with about 15° C. to about 50° C. being particularly preferred. Although it is possible to operate well below these limits, i.e., 0° C., the rate of reaction is unduly diminished. Above about 80° C., however, the yield and the purity of the desired product tend to be reduced by thermal decomposition of a portion of the product, and some undesirable side reactions are favored by the elevated temperature.

The present process is more clearly explained by the following examples which are solely for illustration and in no sense limitative thereof.

EXAMPLE 1

To a glass walled reaction vessel equipped with a magnetic stirrer and containing 6.0 grams of chromium tris-(acetylacetonate) in 100 ml. of chloroform, was added 12 grams of N-bromosuccinimide. At the start of the reaction the reaction mixture was at a temperature of about 23.6° C. The reaction mixture was stirred moderately for a period of about two hours during which time the temperature had risen slightly, due to the exothermic nature of the reaction, and returned to about 24° C. The crude product mass was precipitated by the addition of petroleum ether, and the precipitate washed in turn with a 3% aqueous sodium hydroxide solution and with water. The yield of chromium tris-(3-bromoacetylacetonate) isolated as the red 1:1 chloroform adduct 9.6 grams, 80% of theoretical, and had a melting point of 235–237° C. The chloroform from the solvated halogenated chelate was readily removed by heating the adduct under vacuum at a temperature of about 100° C.

EXAMPLE 2

Using the same apparatus and general procedure of Example 1, 4.0 grams of aluminum tris-(acetylacetonate) were reacted with 7.0 grams of N-bromosuccinimide in 100 ml. of chloroform. After stirring for 1 hour, the precipitated bromo chelate-chloroform adduct was isolated by filtration and washed free of succinimide with excess chloroform to give 6.5 grams of bromo chelate 1:1 chloroform adduct having a melting point of 215–217° C.

EXAMPLE 3

In a glass-walled reaction vessel equipped with a reflux condenser, a mixture of 1.36 grams of N-bromosuccinimide, 2.0 grams of copper bis(acetylacetonate) was refluxed in 50 ml. of chloroform for 100 hours. The mixture was cooled and the solute precipitated by the addition of petroleum ether. The succinimide produced by the reaction was removed from the precipitate by sublimation at about 0.1 mm. Hg and 125° C. for one hour. The residue was then recrystallized from benzene to yield 0.8 gram of the partially brominated chelate, decomposing before melting at 200–215° C.

EXAMPLE 4

A mixture of 1.0 gram of vanadyl bis(acetylacetonate) in 25 ml. of carbon tetrachloride and 1.0 gram of N-chloro-succinimide were refluxed in a glass reactor for about 30 minutes and then cooled. Upone cooling, the crude product precipitated and was collected by filtration. The crude product was purified by subliming off the succinimide at 120° C. (0.5 mm. Hg) for one hour, and then recrystallizing the residue from toluene to give 1.0 gram of olive green vanadyl bis(3-chloroacetylacetonate). The compound decomposed below 200° C. without melting.

EXAMPLE 5

The same chromium chelate as in Example 1 was prepared using a nonadduct-forming solvent medium. To 1.1 grams of chromium tris-(acetylacetonate) in 20 ml. of dimethylformamide was added at room temperature and with stirring 1.8 grams of N-bromosuccinimide. After 5 minutes, approximately 1 gram of brominated product was isolated by filtration of the reaction mass. The product had a melting point of 238–240° C.

EXAMPLE 6

Using the same apparatus and general procedure as in the preceding examples, a number of halogenated β-dicarbonyl chelate compounds were prepared which contained various metal ions, chelate ring substituent groups, and halogens. The compounds produced and a partial elemental analysis thereof are set forth in the following table. All of the compounds corresponded to the general formula:

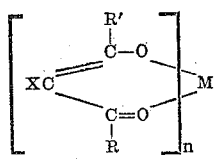

wherein X is the halogen of the halogenating agent, M is the metal ion, n is the number of chelate rings per molecule, and R and R' are inert substituents not involved in the reaction.

*Table I*

| M | n | R | X | R' | M.P. °C. | Calc., Percent | | | Found, Percent | | |
|---|---|---|---|---|---|---|---|---|---|---|---|
| | | | | | | C | H | X | C | H | X |
| Be | 2 | Me | Br | Me | 177–179 | 32.9 | 3.3 | 43.8 | 32.8 | 2.9 | 43.5 |
| Al | 3 | Me | Cl | Me | 194–196 | 42.2 | 4.2 | 24.9 | 42.0 | 4.2 | |
| Al | 3 | Me | Br | Me | 215–216 | 32.1 | 3.2 | 42.7 | 32.5 | 3.8 | 42.0 |
| Al | 3 | Me | I | Me | 231–233 | 25.7 | 2.6 | 54.2 | 24.7 | 2.6 | |
| Al | 3 | Me | Br | OC₂H₅ | 132–134 | 33.2 | 3.7 | 36.8 | 33.2 | 3.9 | |
| Sc | 3 | Me | Br | Me | 180 dec | 31.1 | 3.1 | 41.4 | 32.1 | 3.5 | |
| VO | 2 | Me | Cl | Me | dec.¹ 200 | 35.9 | 3.1 | 21.2 | 35.5 | 3.4 | |
| VO | 2 | Me | Br | Me | dec.¹ 200 | 28.4 | 2.9 | 37.8 | 28.9 | 2.6 | |
| Cr | 3 | Me | Cl | Me | 224–226 | 39.8 | 4.0 | 23.5 | 39.5 | 4.1 | |
| Cr | 3 | Me | Br | Me | 240–241 | 30.7 | 3.1 | 40.9 | 30.4 | 2.9 | 41.2 |
| Cr | 3 | Me | I | Me | 249–249.5 | 24.8 | 2.5 | 52.3 | 24.8 | 2.5 | |
| Fe | 3 | Me | Br | Me | 201–203 | 30.5 | 3.1 | 40.6 | 30.8 | 2.7 | |
| Co | 3 | Me | Cl | Me | dec.¹ ca. 200 | 39.2 | 3.9 | 23.1 | 39.7 | 4.3 | |
| Co | 3 | Me | Br | Me | dec.¹ ca. 200 | 36.5 | 3.7 | 40.4 | | | 42.0 |
| Cu | 2 | Me | Cl | Me | dec.¹ 200 | 36.3 | 3.6 | 21.4 | 36.0 | 4.0 | |
| Cu | 2 | Me | Br | Me | dec.¹ 200 | 28.6 | 2.9 | 38.1 | | | 38.1 |
| Cu | 2 | Me | Br | φ | 208–210 | 44.5 | 2.9 | 29.2 | 44.5 | 2.7 | 29.3 |
| Ga | 3 | Me | Br | Me | 212–212.5 | 29.8 | 3.0 | 39.7 | 30.7 | 3.2 | |

¹ Decomposes without melting.

Following the reaction of the metal chelate and the halogenating agent, the reaction product mass can be treated in a variety of ways to obtain separation of the halogenated chelate compound. For instance, assuming a product mass of a bromo chelate and succinimide in a carbon tetrachloride medium, (a) if the bromo chelate is quite soluble as are Al⁺⁺⁺, Cr⁺⁺⁺, Ga⁺⁺⁺ and Be⁺⁺⁺ chelates generally) the succinimide is removed by filtration, the carbon tetrachloride partially evaporated, and the product obtained by precipitating with a nonsolvent such as petroleum ether; or (b) if the bromo chelate is relatively insoluble as are Cu⁺⁺ and (V=O)⁺⁺ chelates generally, the entire reaction product mass can be taken to dryness and the succinimide removed by sublimation at reduced pressure (.05 mm. Hg) at 100–125° C.; or (c) the succinimide can be removed in some instances, as when the bromo chelate is the 3-bromopentane-2,4-dionate of chromium III, by simply washing with a 5% aqueous sodium hydroxide solution.

The halogenated β-dicarbonyl chelates produced by the process of the present invention possess the same utility as their nonhalogenated precursors which are well known in the art. In addition, the halogenated analogues decompose, generally at temperatures within the range of from about 150° C. to about 250° C., to produce lachrymatory products. The decomposition products of the bromine-containing analogues are particularly strong lachrymators. Thus, being non-noxious compounds at ordinary temperatures, the halogenated chelate compounds are useful as additives to conventional coating compositions such as paints and varnishes for electrical apparatus and the like where danger from overheating is a common problem. In the event the coating composition becomes overheated, the evolution of the lachrymatory products of thermal decomposition of the halochelate serves as a means of warning of the impending danger.

What is claimed is:

1. The method for preparing halogen-containing analogues of metal chelates of β-dicarbonyl compounds which comprises reacting in a substantially inert liquid organic medium, an organic halogenating agent containing a halogen having an atomic weight greater than 20 directly attached to a nonbasic nitrogen atom, with a chelate compound of a polyvalent metal having at least one six membered conjugated β-dicarbonyl chelate ring, one of the carbon atoms of at least one of said chelate rings being chemically bonded to two adjacent ring carbon atoms and to a hydrogen atom, said hydrogen-carbon bond being the sole reactive point of said metal chelate with respect to the halogenating agent.

2. The method according to claim 1 wherein the metal chelate has the general formula

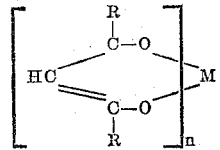

wherein M is a polyvalent metal ion, n is an integer equal to the valence of M, and R is individually at each occurrence a monovalent organic radical free of amido groups.

3. The method according to claim 2 wherein the polyvalent metal ion has an atomic number of from 21 to 28 inclusive, and R is a monovalent hydrocarbon radical.

4. The method according to claim 2 wherein the polyvalent metal ion is a member selected from the group consisting of beryllium, aluminum, copper and gallium, and R is a monovalent hydrocarbon radical free of aliphatic unsaturation.

5. The method for preparing halogen-containing analogues of metal chelates of β-dicarbonyl compounds which comprises reacting in a substantially inert liquid organic medium, an N-haloimide in which the halogen has an atomic weight of greater than 20, with a chelate compound of a polyvalent metal having at least one six-membered conjugated β-dicarbonyl chelate ring, one of the carbon atoms of said chelate rings being chemically bonded to two adjacent ring carbon atoms and to a hydrogen atoms, said hydrogen-carbon bond being the sole reactive point of said metal chelate with respect to the N-haloimide.

6. The method acording to claim 5 wherein the N-haloimide is an N-halosuccinimide in which the halogen has an atomic weight greater than 20.

7. The method for preparing halogen-containing analogues of metal chelates of β-dicarbonyl compounds which comprises reacting in a substantially inert liquid organic medium, an N-haloamide in which the halogen has an atomic weight of greater than 20, with a chelate compound of a polyvalent metal having at least one six-membered conjugated β-dicarbonyl chelate ring, one of the carbon atoms of said chelate rings being chemically bonded to two adjacent ring carbon atoms and to a hydrogen atom, said hydrogen-carbon bond being the sole reactive point of said metal chelate with respect to the N-haloamide.

References Cited in the file of this patent

UNITED STATES PATENTS 2,933,475     Hoover et al. _____ Apr. 19, 1960

FOREIGN PATENTS 777,544     Great Britain _____ June 26, 1957
570,197     Canada _____ Feb. 3, 1959
572,133     Canada _____ Mar. 10, 1959